United States Patent
Mc Gee et al.

(10) Patent No.: US 6,654,067 B1
(45) Date of Patent: Nov. 25, 2003

(54) FINDING HIDDEN IMAGES IN VIDEO BASED ON DETECTED PROXIMITY OF CUTS

(75) Inventors: Thomas Mc Gee, Garrison, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/477,083

(22) Filed: Dec. 30, 1999

(51) Int. Cl.[7] .............. H04N 5/14; G06K 9/36; H04B 1/66
(52) U.S. Cl. ............. 348/700; 375/240.16; 382/236
(58) Field of Search ............... 348/700, 415.1, 348/405.1, 699, 155; 375/240.25, 240.16; 382/107, 236; 352/129

(56) References Cited

U.S. PATENT DOCUMENTS

| | | | |
|---|---|---|---|
| 5,017,143 A | 5/1991 | Backus et al. | 434/236 |
| 5,083,860 A * | 1/1992 | Miyatake et al. | 352/129 |
| 5,493,345 A * | 2/1996 | Ishikawa et al. | 348/700 |
| 6,341,168 B1 * | 1/2002 | Nagasaka et al. | 382/107 |

FOREIGN PATENT DOCUMENTS

| | | | |
|---|---|---|---|
| EP | 0690413 A2 | 1/1996 | G06T/7/20 |
| WO | WO9823085 | 5/1998 | H04N/5/14 |
| WO | WO9823087 | 5/1998 | H04N/5/44 |

OTHER PUBLICATIONS

Abstract for JP09074575A dated Mar. 18, 1997.
Abstract for RD 408046 dated Apr. 10, 1998.

* cited by examiner

Primary Examiner—Gims S. Philippe

(57) ABSTRACT

To prevent undesired images from appearing in moving video images, short-duration portions of video information contained within longer video works are detected and reported by, for example, displaying the short-duration portions on a monitor. These short-duration portions are detected, for example, by locating scene cuts, region cuts, or object cuts that occur in rapid succession.

16 Claims, 4 Drawing Sheets

FINDING HIDDEN IMAGES IN VIDEO BASED ON DETECTED PROXIMITY OF CUTS

FIELD OF THE INVENTION

The field of the present invention relates to video image processing and, more particularly, to the detection of short-duration scenes (or objects within scenes) that appear within a longer video sequence.

BACKGROUND OF THE INVENTION

Virtually all conventional moving video images are generated by displaying a series of still images one after another in rapid succession. Each of these still video images is commonly referred to as a frame. When the frame rate is low (e.g. five frames per second), the resulting video image will flicker objectionably. But when the frame rate is increased sufficiently, the resulting sequence of still images will be perceived by human observers as a smooth, flicker-free moving image, due to the normal operation of the human eye and brain. In the United States, a commonly used frame rate that provides flicker-free moving video images is thirty frames per second (fps).

At the standard 30 fps rate, however, video information can be inserted into a single frame of a video clip, and still remain undetectable to ordinary observers. This effect occurs because the video information in a single frame is not displayed for a sufficiently long time to be noticed by viewers. When the video clip is displayed in slow motion or stop motion, however, the otherwise undetectable video information is revealed. This situation provides an opportunity for disgruntled workers and practical jokers to insert inappropriate and potentially embarrassing material (e.g. pornography) into moving video images.

The standard 30 fps rate also provides an opportunity to insert subliminal messages into moving video images that can not be detected by ordinary observers. In fact, patents have even been issued (e.g., U.S. Pat. No. 5,017,143) describing ways to produce this type of subliminal message.

For quality control purposes, producers of moving video images videos may wish to check that no inappropriate, embarrassing, or subliminal images have been included in their products, even for a single frame. Until now, however, the only way to check for these undesired images has been to watch the entire video one frame at a time. But because frame-by-frame checking is a painstakingly slow process, it is commonly skipped, and products are released without checking for undesired frames of video information.

Numerous techniques for finding a point in a moving video image where one scene ends and another scene begins (hereinafter referred to as a "scene cut") can be found in the prior art. Examples include International Publication WO 98/23085; "A hierarchical multi-resolution video transition detection scheme" by H. Yu and W. Wolf, to appear in the Journal of Computer Vision and Image Understanding, Academic Press; "A Feature-Based Algorithm for Detecting and Classifying Scene Breaks" by R. Zabih, J. Miller, and K. Mai, Proc. ACM Multimedia, San Francisco, 1995, pp. 189–200; and "Automatic Partitioning of Full-Motion Video" by H. J. Zhang, A. Kankanhalli, and S. W. Smoliar, Multimedia Systems, ACM-Springer, Vol. 1, No. 1, 1993, pp. 10–28, each of which is incorporated herein by reference.

The prior art also discusses detecting when a region within a scene changes, even when the remainder of the scene remains constant (hereinafter referred to as a "region cut"), e.g., in "Video Keyframe Extraction and Filtering: A Keyframe is not a Keyframe to Everyone" by N. Dimitrova, T. McGee, and H. Elenbaas, Proc. ACM Conf. on Knowledge and Information Management, 1997, pp.113–120, which is incorporated herein by reference.

Techniques for eliminating undesirable video information from a moving video image are also described in the prior art. For example, "Parsing TV Programs for Identification and Removal of Non-story Segments" by T. McGee and N. Dimitrova, presented at Storage and Retrieval for Image and Video Data Bases VII in San Jose, Calif., in January 1999 describes removing non-story segments (e.g., commercials) from within the broadcasted material. These prior art techniques, however, are not directed at finding and eliminating short-duration segments of video information that may be hidden within a longer video work.

SUMMARY OF THE INVENTION

The present invention relates to finding and reporting short-duration portions of video information that are contained within longer video works.

The present invention operates by locating cuts that occur in rapid succession. When two cuts in rapid succession are located, the video information contained between those two cuts is reported by, for example, displaying it on a monitor.

One aspect of the present invention relates to a method of finding short-duration images within a series of frames of video data. The method includes the steps of locating a first cut in the video data, locating a second cut in the video data, determining a number of frames of the video data that are located between the first cut and the second cut, and outputting an indication when the number of frames determined in said determining step is less than a threshold.

Another aspect of the present invention relates to a method of finding short-duration images within a series of frames of video data. The method includes the steps of locating a first cut in the video data corresponding to a first time, locating a second cut in the video data corresponding to a second time, and outputting an indication when a difference between the first time and the second time is less than a threshold.

DETAILED DESCRIPTION OF THE PREFERRED EMBODIMENTS

Figure 1:
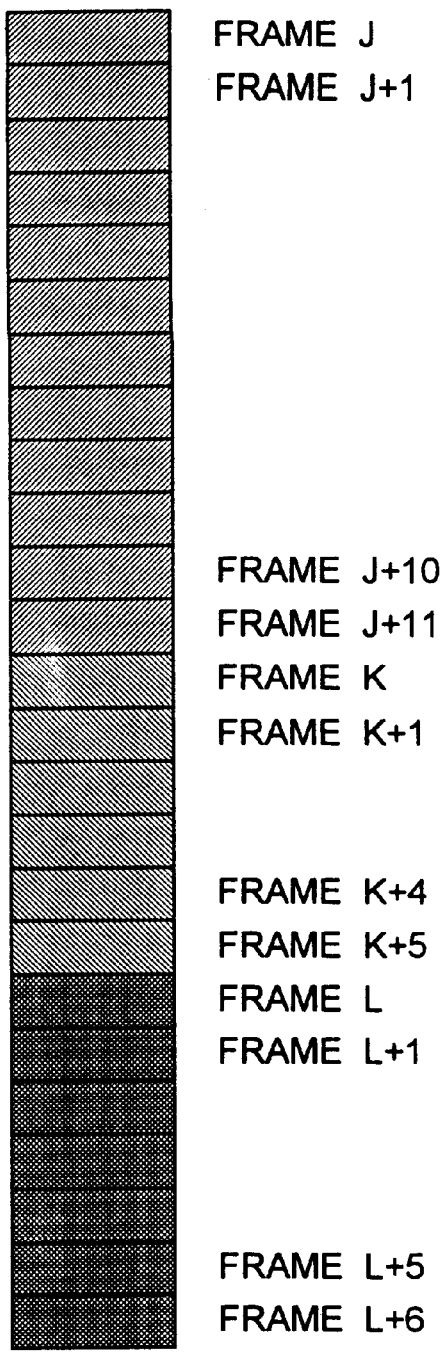
FIG. 1 is a frame diagram that represents a sequence of frames for three consecutive scenes, with no undesired video frames.
Figure 2:
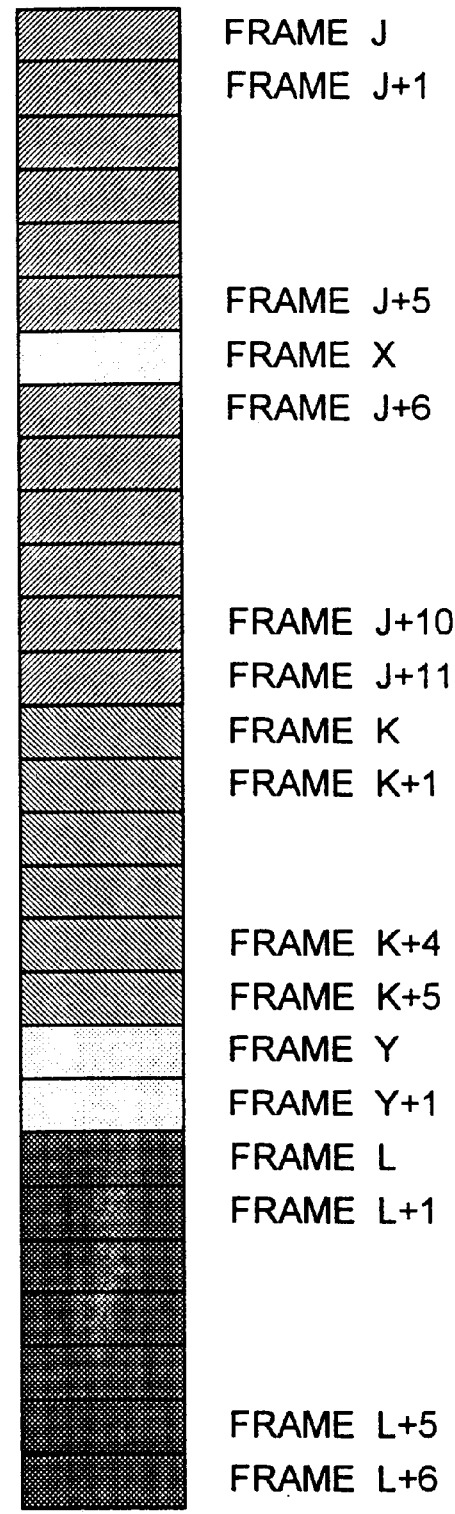
FIG. 2 is a frame diagram showing that represents a sequence of frames for the same three consecutive scenes as FIG. 1, with undesired video frames added.

FIGS. 1 and 2 represent sequences of video frames, and are helpful for explaining the preferred embodiments described herein.

FIG. 1 represents a sequence of video frames that contains no undesired video information. In the illustrated example, frames J through J+11 represent a first scene J; frames K through K+5 represent a second scene K; and frames L through L+6 represent a third scene L. Of course, while the illustrated example contains scenes J, K, and L having lengths of 12, 6, and 7 frames respectively, scenes of different lengths may be also processed by the embodiments described below. At the standard frame rate of 30 fps, the middle scene K, which contains six frames, will appear for 0.2 seconds. This duration is sufficiently long so that scene K should be visible to an ordinary observer. As a result, if scene K depicted undesirable video information, the undesirable information could be detected by simply watching the entire moving video image in real time.

FIG. 2 is a diagram that includes the same three scenes as FIG. 1, but also includes two short-duration segments of undesired video information inserted therein. More specifically, frame X appears in the middle of scene J, between frames J+5 and J+6; and frames Y and Y+1 appear after scene K and before scene L. At the standard frame rate of 30 fps, scene X, which contains one frame, will appear for only 1/30 of a second, and scene Y, which contains two frames, will appear for 1/15 of a second. These durations are sufficiently short so that these scenes will not be visible to an ordinary observer.

Figure 3:
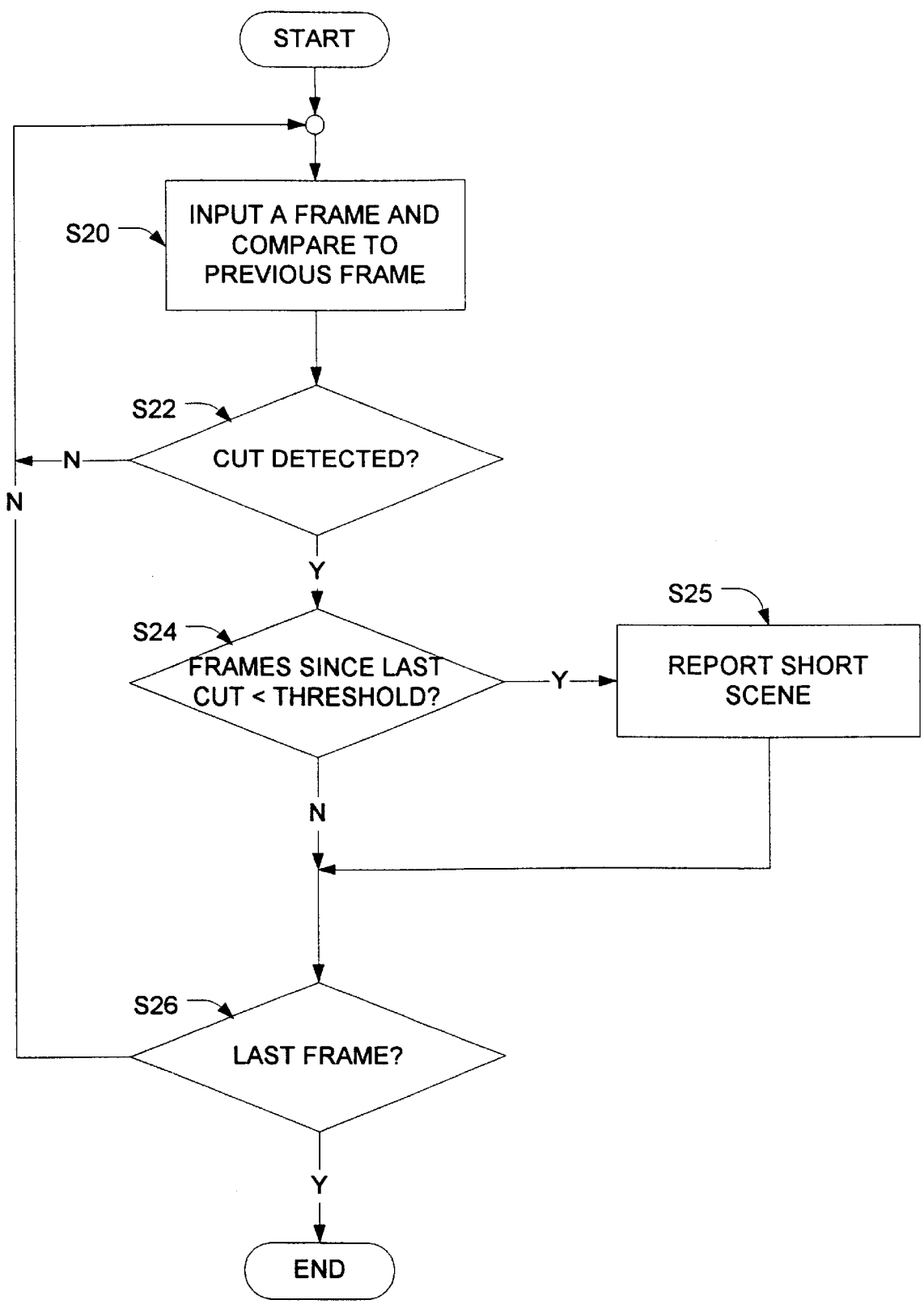
FIG. 3 is a flowchart of a preferred process for detecting short segments of undesired video information.

FIG. 3 is a flowchart of suitable process that detects short scenes such as scenes X and Y (shown in FIG. 2), and reports those short scenes. It operates by locating the *cuts between scenes, and checking to see whether any two cuts are close enough so that the intervening scene would not be noticed by an observer in real time watching the entire moving video image in real time.

First, in step S20, the system inputs a frame and compares that frame to a previous frame. This frame-to-frame comparison may be implemented using any of a variety of techniques well known to persons skilled in the art. For example, the raw video data for a given frame may be compared to a raw video data from the previous frame. Alternatively, the chrominance or luminance signals for a given frame may be compared to the corresponding signals from the previous frame. Frames may also be compared in the compressed domain by comparing compressed data (e.g., MPEG compressed data) on either a block level or a macroblock level. For example, discrete cosine transform DCT coefficients for data representing each 8 pixel by 8 pixel block may be compared to the DCT coefficients for the corresponding blocks in the adjacent frames.

As yet another alternative, a fingerprint (or signature) of each frame may be computed such that the fingerprint characterizes each frame in a relevant manner. Then, instead of comparing the raw data between frames, the fingerprints for the current frame is compared to the fingerprint for the previous frame. One suitable approach for implementing frame fingerprints is to detect significant structure points within each frame, connect those points with a set of triangles, and then generate an inventory of the internal angles of these triangles. This inventory is then used to generate a histogram of angles, which serves as the fingerprint for the frame. Numerous alternative frame comparison techniques can be readily envisioned.

When a given frame is compared to a previous frame, the similarity between frames is determined. When the data (or fingerprints) are sufficiently similar, the two frames are deemed to belong to the same scene. When the data or fingerprints are not sufficiently similar, the two frames are deemed not to belong to the same scene. The degree of similarity required to decide that two frames are "sufficiently similar" will depend on the particular method used to compare the frames as well as an optional confidence threshold.

For example, when raw video data is compared, the frames may be deemed sufficiently similar when the number of identical pixels exceeds a threshold (e.g., 80%). Optionally, a suitable tolerance may be applied when determining which pixels are identical. In the alternative embodiment that uses angle histograms, as described above, the frames may be deemed sufficiently similar when the 90% of the angles tracked in the histograms are the same. Optionally, a suitable angle comparison tolerance may be applied so that an angle in a given histogram category is deemed to match its neighbor on either side. For example, if the histogram sorts the angles into 5° categories, the three angle categories between 5 and 20° may be treated as matching the angle category of 10–15°.

Preferably, a probability that the compared frames match each other is computed based on either the raw data or the fingerprint comparison. This computed probability is then compared to a predetermined probability threshold. When the computed probability exceeds the probability threshold, the comparison of step S20 returns a result that no cut has been detected.

In step S22, the result of this comparison is checked. If the frames are sufficiently similar, no cut is detected, and processing returns to step S20, where the next frame is processed. If, on the other hand, the frames are not sufficiently similar, a cut is detected in step S22, and processing continues at step S24, where the number of frames since the last cut is compared to a threshold.

If the comparison of step S24 indicates that the number of frames is not less than the threshold (which will be the case when the scene between the cuts is sufficiently long), processing continues at step S26 where a test is performed to determine whether the last frame has been input. If the last frame has not been input, processing continues back at step S20 where the next frame is input. Once the last frame has been input, processing ends.

If, on the other hand, the comparison of step S24 indicates that the number of frames is less than the threshold (which will be the case when the scene between the cuts is sufficiently short), processing continues at step S25 where the short scene is reported. This may be accomplished in any suitable manner, such as displaying the short scene on a monitor or printing out the relevant frame numbers. Optionally, the frames corresponding to the short scene may be deleted (in addition to or in place of the reporting). After the short scene is reported, processing continues at step S26, as described above.

In an example where the threshold is set to three, and the input data depicted in FIG. 1 is processed by the above described method, one cut will be detected between frames J+11 and frame K, and another cut will be detected between frame K+5 and frame L. Because the number of frames between these two cuts is six frames (which is greater than the threshold), the result of the comparison in step S24 will always be NO, and no short scenes will be reported.

If, on the other hand, the sequence of frames depicted in FIG. 2 is processed by the above-described method when the threshold is set to three, cuts will be detected between frames J+5 and frame X; between frame X and frame J+6; between frame J+11 and frame K; between frame K+5 and frame Y; and between frame Y+1 and frame L. Now, when the number of frames since the last cut is compared to the threshold in step S24, that number will be less than the threshold for the cut detected between frame X and frame J+6, and a short scene corresponding to frame X will be reported. In addition, when the cut between frame Y+1 and frame L is detected, the number of frames since the last cut will also be less than the threshold, and a short scene corresponding to frames Y and Y+1 will be reported.

At frame rates of 30 fps, the threshold is preferably selected to be between two and six, which results in short scene detection for scenes having one to five frames. The threshold may even be set higher (e.g., to about ten), to detect somewhat longer scenes. When the frame rate is something other than 30 fps, suitable adjustments to this threshold should be made so that all short scenes are detected.

In an alternative embodiment, instead of tracking the number of frames between cuts, the system may track the amount of time elapsed between detected cuts. When frames are being inputted at 30 fps, a suitable time threshold for reporting a short scene would be on the order of 1/30 of a second. When frames are being inputted at another rate, suitable adjustments to this time threshold should be made.

Figure 4:
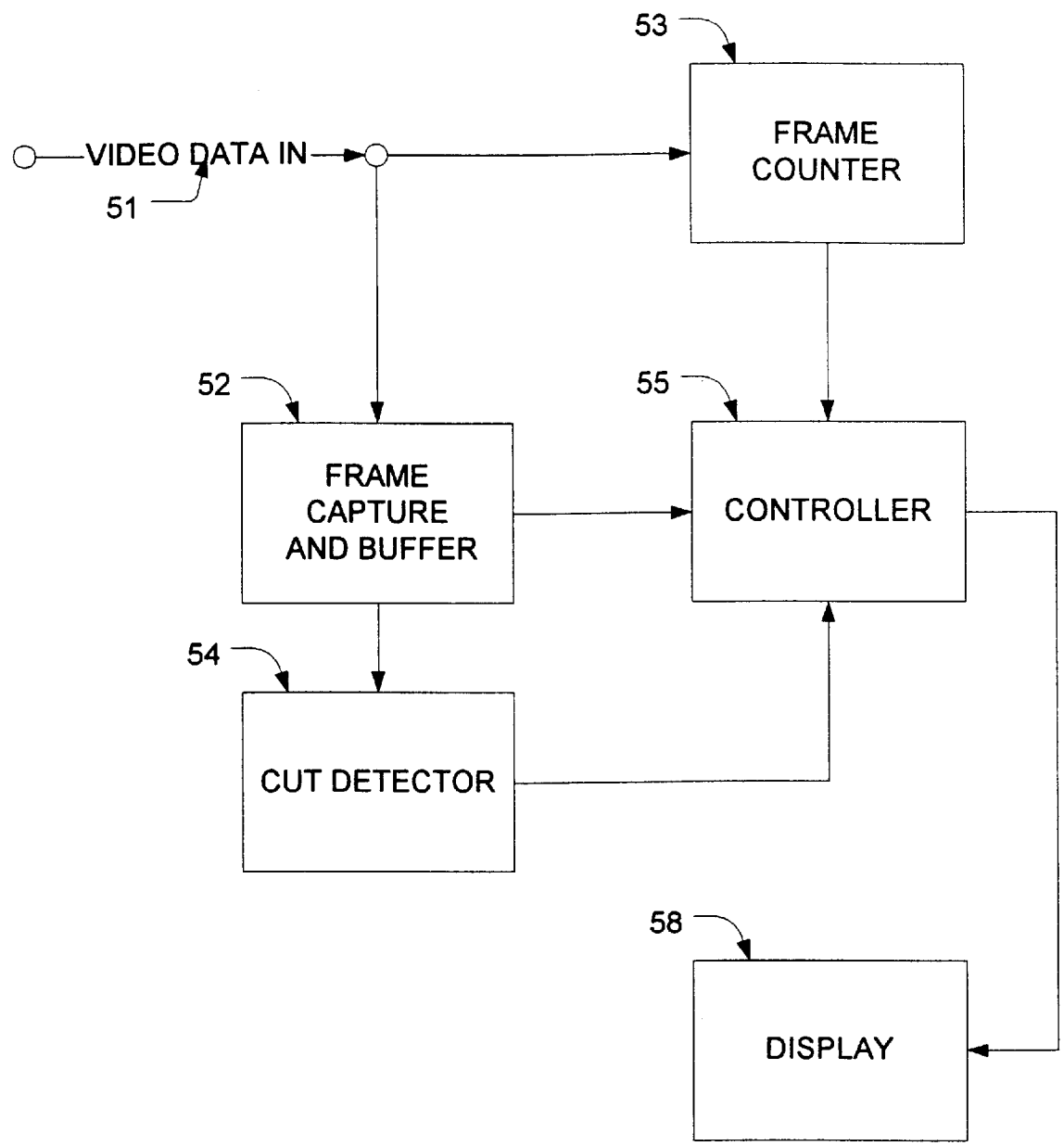
FIG. 4 is a block diagram of a suitable system for implementing the processes illustrated in the flowchart of FIG. 3.

FIG. 4 is an example of a suitable hardware implementation for implementing the process steps described in connection with FIG. 3. Preferably, these process steps are controlled by the controller 55. The hardware configuration for the controller 55 may be implemented, for example, using a microprocessor cooperating with a program-store memory and a random access memory (not shown), or using a-hard-wired logic controller. Details of implementing these types of controllers are well known to persons skilled in the art.

A video data input 51 is provided to the frame buffer 52 and to the frame counter 53. The frame buffer 52 temporarily stores each frame of video data. The cut detector 54 compares the frames obtained from the frame buffer 52, and reports a cut when a frame is not sufficiently similar to the previous frame, as described above. Cuts are reported to the controller 55 in any suitable manner (e.g., using polling or interrupts).

In the FIG. 4 embodiment, the frame counter 53, which may be implemented in either hardware or software in any conventional manner, is used to keep track of the frame number. The frame counter 53 is preferably incremented each time a new frame of video data 51 is inputted or processed. The value of the frame counter is preferably stored in a suitable memory (e.g., a RAM, a register, or a latch, not shown) whenever a cut is detected by the cut detector 54. The number of frames since the last cut (used in step S24 of FIG. 3) can then be determined, for example, by subtracting the current value of the frame counter from the previously stored value.

When the number of frames between cuts is less than the threshold, the controller 55 reports this condition. Reporting may be accomplished in any suitable manner, including, for example, displaying frames from the short scene on the display 58, or printing out a frame number on a printer (not shown).

In an alternative embodiment (not shown), the frame counter 53 and the cut detector 54 may be implemented in software in the microprocessor 55.

Figure 5:
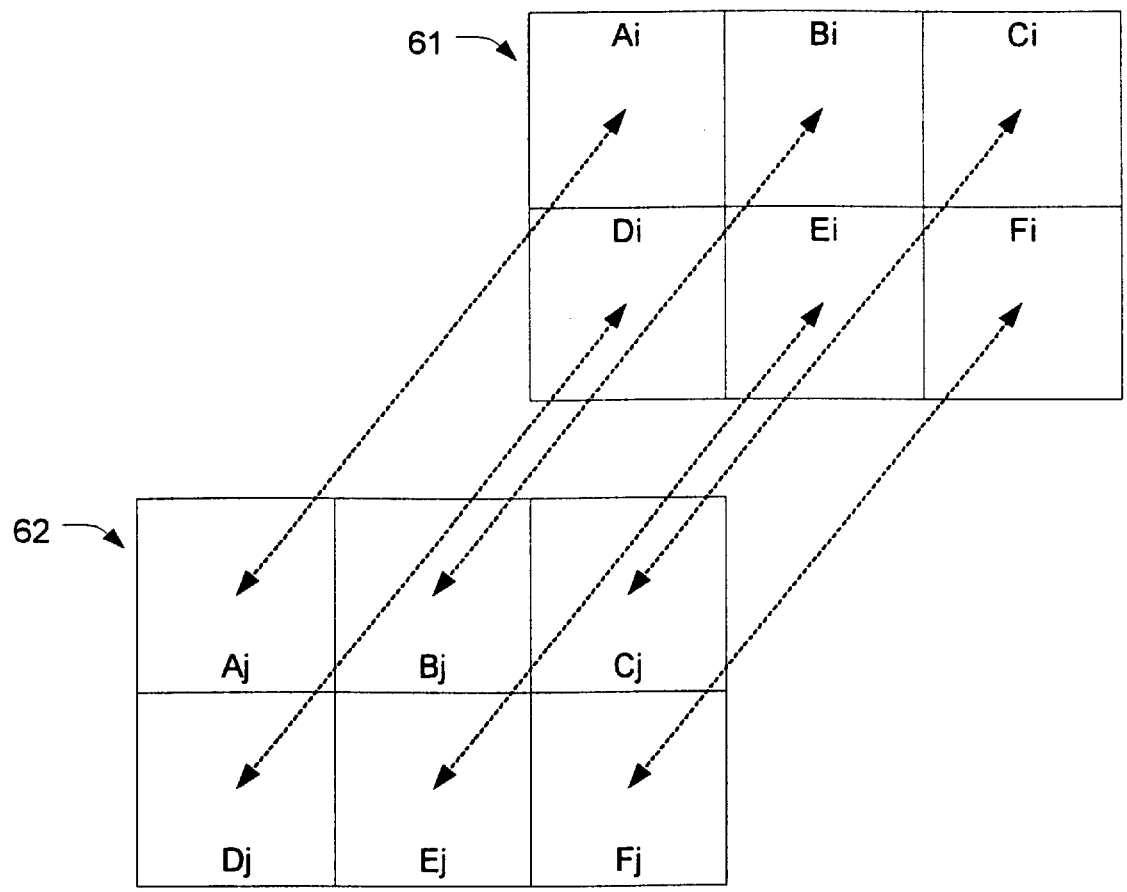
FIG. 5 is a diagram that shows how a frame may be split up into regions.

In another alternative embodiment, each frame is broken down into a plurality of regions (e.g., between 6 and 50 regions), and the video data corresponding to each region is compared to the corresponding region in the previous frame. FIG. 5 shows how a first frame 61 is divided into regions Ai through Fi, and a subsequent frame 62 is divided into regions Aj through Fj. Each of these image regions is compared to the corresponding region in the other frame, as indicated by the double-ended dashed arrows, and cut detection is performed independently in each region. When a cut is detected in any of the regions, a cut is reported to the controller for the entire frame. The frames located between the cuts are then reported, as described above. Searching for cuts region-by-region instead of scene-by-scene increases the sensitivity of the system and enables the system to detect smaller objects that may have been undesirably inserted into a moving video image for short times.

In yet another alternative embodiment, each frame is broken down into a plurality of objects. Preferably, each object corresponds to an arbitrarily shaped region having a substantially uniform color (e.g., a person's face or an article of clothing). Objects may be identified as described in U.S. application Ser. No. 08/867,140, filed Jun. 2, 1997. Optionally, a signature may generated for each object, or for each i by j pixel block of data within each object. A list of the objects present in each frame and their locations is then compiled, and a cut is reported whenever an object appears. When an object appears for a small number of frames and then disappears, the frames corresponding to that object are reported (as described above). Optionally, this reporting may be inhibited in scenes where many cuts are detected in rapid succession (e.g., in fast-moving scenes). Searching for cuts on an object-by-object basis in this manner may also improve the system's ability to detect undesired objects that have been inserted into a moving video image.

In accordance with the above described embodiments, by detecting when scene cuts, region cuts, or object cuts appear in rapid succession, moving video images can be checked for objectionable material rapidly, without requiring a user to view each frame of the video individually. This enables the producers of the moving video images to implement quality control quickly and inexpensively, and thereby avoid being embarrassed by the inclusion of undesired material.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

What is claimed is:

1. A method of finding short-duration images within a series of frames of video data, the method comprising the steps of:

locating a first cut in the video data;

locating a second cut in the video data;

determining a number of frames of the video data that are located between the first cut and the second cut; and outputting an indication when the number of frames determined in said determining step is less than a threshold, wherein the step of locating a first cut comprises the stet of locating a significant change between a region of two adjacent frames of video data, the region comprising a portion of each of the two adjacent frames that is less than the entire frame, and the step of locating a second cut comprises the step of locating a significant change between a corresponding region of two adjacent frames of video data, the corresponding region comprising a portion of each of the two adjacent frames that is less than the entire frame.

2. The method of claim 1, wherein changes between the regions of adjacent frames of video data are located by computing a signature function for each region, and determining when a difference between the computed signature functions exceeds a confidence threshold.

3. The method of claim 1, wherein the step of outputting comprises the step of displaying at least one of the video frames that are located between the first cut and the second cut.

4. The method of claim 1, further comprising the step of deleting the video frames that are located between the first cut and the second cut.

5. The method of claim 1, wherein the threshold is two frames.

6. The method of claim 1, wherein the threshold is three frames.

7. The method of claim 1, wherein the threshold corresponds to a time of about one tenth of a second.

8. The method of claim 1,
wherein the step of outputting comprises the step of displaying at least one of the video frames that are located between the first cut and the second cut, and
wherein the threshold is three frames.

9. A method of finding short-duration images within a series of frames of video data, the method comprising the steps of:
locating a first cut in the video data corresponding to a first time;
locating a second cut in the video data corresponding to a second time; and
outputting an indication when a difference between the first time and the second time is less than a threshold,
wherein the step of locating a first cut comprises the step of locating a significant change between a region of two adjacent frames of video data, the region comprising a portion of each of the two adjacent frames that is less than the entire frame, and the step of locating a second cut comprises the step of locating a significant change between a corresponding region of two adjacent frames of video data, the corresponding region comprising a portion of each of the two adjacent frames that is less than the entire frame.

10. The method of claim 9, wherein changes between the regions of adjacent frames of video data are located by computing a signature function for each region, and determining when a difference between the computed signature functions exceeds a confidence threshold.

11. A method of finding short-duration images within a series of frames of video data, the method comprising the steps of:
locating a first cut in the video data corresponding to a first time;
locating a second cut in the video data corresponding to a second time; and
outputting an indication when a difference between the first time and the second time is less than a threshold,
wherein the step of locating a first cut comprises the step of detecting an appearance of an object, and the step of locating a second cut comprises the step of detecting a disappearance of the object.

12. The method of claim 11, further comprising the steps of computing a signature function for the object and tracking motion of the object.

13. The method of claim 9, wherein the step of outputting comprises the step of displaying at least one of the video frames that are located between the first cut and the second cut.

14. The method of claim 9, further comprising the step of deleting the video frames that are located between the first cut and the second cut.

15. The method of claim 9, wherein the threshold corresponds to a time of about one tenth of a second.

16. The method of claim 9, wherein the threshold corresponds to a time of about 1/30 of a second.

* * * * *